United States Patent
Beelitz et al.

(10) Patent No.: US 6,470,446 B1
(45) Date of Patent: Oct. 22, 2002

(54) METHOD FOR PREPARING COMPUTER HARD DISKS DURING INSTALLATION OF A NETWORK OPERATING SYSTEM

(75) Inventors: Alan E. Beelitz, Leander; Alexander Krigsfeld; Andrew Wilks, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/488,326

(22) Filed: Jan. 20, 2000

(51) Int. Cl.[7] .............................................. G06F 15/177
(52) U.S. Cl. .................... 713/2; 713/2; 717/176
(58) Field of Search ...................... 717/11, 7, 168–176; 713/2

(56) References Cited

U.S. PATENT DOCUMENTS

| | | | | |
|---|---|---|---|---|
| 5,325,532 A | * | 6/1994 | Crosswy et al. ................ | 713/2 |
| 5,974,567 A | * | 10/1999 | Dickson, Jr. et al. .......... | 714/27 |
| 6,038,399 A | * | 3/2000 | Fisher et al. ................... | 717/11 |
| 6,138,179 A | * | 10/2000 | Chrabaszez et al. ........... | 710/10 |
| 6,247,126 B1 | * | 6/2001 | Beelitz et al. .................. | 713/1 |
| 6,317,826 B1 | * | 11/2001 | McCall et al. ................. | 713/1 |

\* cited by examiner

*Primary Examiner*—Tuan Q. Dam
*Assistant Examiner*—Chuck Kendall
(74) *Attorney, Agent, or Firm*—Haynes and Boone, LLP

(57) ABSTRACT

Method and apparatus for partitioning a hard disk during installation of a network OS. In one embodiment, a computer system is booted from a CD-ROM containing a computer server setup ("CSS") program. The CSS program prompts a user for certain disk preparation data, including the primary and utility partition sizes and volume label. The CSS program then writes a self-loading binary image ("SLBI") to the first track of the first hard disk immediately following the master boot record ("MBR"). The SLBI includes a bootstrap loader, disk preparation code, and the disk preparation data. The sector address of the SLBI bootstrap loader is placed into a partition descriptor within the master partition table ("MPT") of the MBR. The computer is then rebooted and control transferred to the SLBI, which the prepares the hard disk by partitioning the disk to include a utility and primary partition of the desired sizes and volume label (primary partition) and formatting these partitions appropriately. The SLBI then removes itself from the first track and updates the MPT with the new descriptors, at which point the computer system is again rebooted.

12 Claims, 1 Drawing Sheet

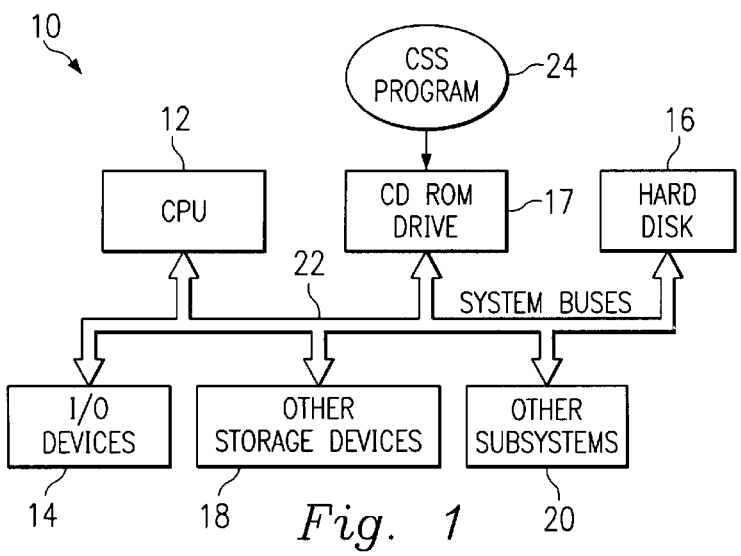
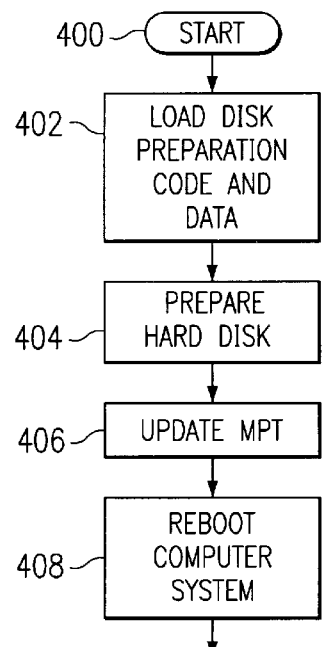
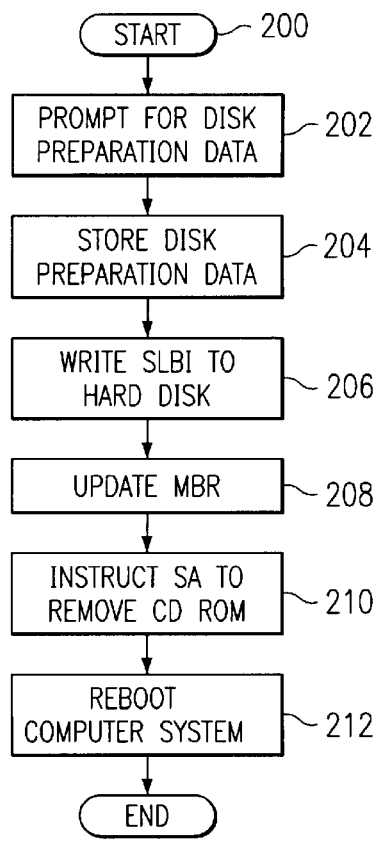
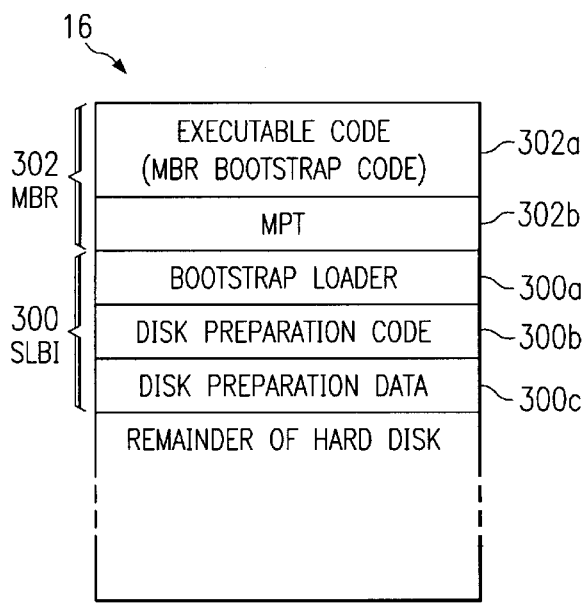

METHOD FOR PREPARING COMPUTER HARD DISKS DURING INSTALLATION OF A NETWORK OPERATING SYSTEM

BACKGROUND

The disclosures herein relate generally to partitioning a hard disk and, more particularly, to a system and method for partitioning a hard disk during installation of a network operating system ("OS") that requires minimal user intervention.

Preparing (i.e., partitioning and formatting) a hard disk usually requires copying the DOS utilities fdisk.exe ("FDISK") and format.exe ("FORMAT") to a floppy disk, after which a system administrator manually configures the partitions using FDISK. After running FDISK, the computer system must be rebooted prior to formatting the hard disk using the FORMAT utility, so that the OS can recognize the newly created partition(s). The volume label for the primary partition must be entered using the FORMAT utility. This is a tedious manual process.

The Dell Server Assistant ("DSA") available from Dell Computer Systems of Round Rock, Tex., is a bootable compact disk ("CD") used to set up server systems, including installing a network OS thereon. The DSA boots into a Windows 9x environment in which partitioning software cannot normally be run. To enhance the customer experience, it is desirable that the DSA program enable selection of the hard disk partition information and then reboot the computer system to partition and format the hard disk. It is further desirable that no user interaction, other than selecting the size of the partition and the volume label, be required during this process.

Although tools exist that can partition and format hard disks with minimal user intervention, it is usually not advisable to ship such tools to customers, as doing so would potentially expose valuable intellectual property to those customers. Ideally, a required subset of the functionality would be shipped in a manner that does not compromise intellectual property rights.

Therefore, what is needed is a method and apparatus for partitioning a hard disk during installation of a network OS with minimal user intervention.

SUMMARY

One embodiment, accordingly, provides a method and apparatus for partitioning a hard disk during installation of a network OS. To that end, a method of preparing a hard disk of a computer during installation of a network operating system thereon, includes prompting a user to specify disk preparation data for the hard disk. The data is stored in a self-loading binary image (SLBI). The computer system is rebooted from the SLBI. The hard disk is formatted and partitioned using the disk preparation data. A master partition table (MPT) of the hard disk is updated to include a partition descriptor for each of at least one partition created during the formatting and partitioning, wherein one such partition descriptor is marked as active. The computer system is then rebooted.

A principal advantage of this embodiment is that it facilitates the preparation of a hard disk during OS installation while ensuring that valuable intellectual property rights are not compromised.

Another advantage of this embodiment is that it eliminates the necessity of booting from a floppy disk running MS-DOS to prepare a hard disk.

BRIEF DESCRIPTION OF THE DRAWING FIGURES

FIG. 1 illustrates a block diagram of a computer for implementing one embodiment of the present disclosure.

FIG. 2 is a flowchart of the operation of a computer server setup ("CSS") program of one embodiment.

FIG. 3 is a layout diagram of a hard disk of the computer of FIG. 1.

FIG. 4 is a flowchart of the operation of code contained in a self-loading binary image ("SLBI") of one embodiment.

DETAILED DESCRIPTION

Referring briefly to FIG. 1, a system block diagram of a computer system 10 is shown having features thereof configured in accordance with one embodiment. The computer system 10 includes a central processing unit (CPU) 12, input/output (I/O) devices, such as a display, a keyboard, a mouse, and associated controllers, collectively designated by a reference numeral 14, one or more hard disks and drives, collectively represented by a hard disk 16, a CD-ROM drive 17, other storage devices, such as a floppy disk drive, random access memory (RAM), non-volatile random access memory (NVRAM), read-only memory (ROM) and other memory devices, collectively designated by a reference numeral 18, and various other subsystems, such as a network interface card (or NIC), modem, or watchdog timer, all collectively designated by a reference numeral 20, all interconnected via one or more buses, shown collectively in FIG. 1 as a bus 22. In the present example, the computer system 10 can be a personal computer running Microsoft DOS and/or WINDOWS. It is understood, however, that the computer system 10 and its illustrated components are merely representative of many different types of computers and components well known and understood by those of ordinary skill in the art.

As will be recognized by those of ordinary skill in the art, a hard disk, such as the hard disk 16, is typically subdivided into at least three different partitions, including a master boot record ("MBR"), a utility partition of a specified size, and a primary partition of a specified size and having a specified volume label.

In accordance with a preferred embodiment, the computer system 10 is booted from computer-readable media containing a computer server setup ("CSS") program 24, the operation of which is described in greater detail below and which functions generally to install a network OS on the computer system 10. In the illustrated embodiment, the CSS 24 is stored on a CD-ROM inserted into the CD-ROM drive 17.

FIG. 2 is a flowchart of the operation of the CSS 24 of the present invention. Execution begins in step 200, after the computer system 10 is booted from the CSS CD-ROM 24 and the CSS receives control. In step 202, the system administrator is prompted for disk preparation data, including the type of network OS, and primary partition size, utility partition size, and volume label for the hard disk 16. In step 204, the disk preparation data obtained in step 202 is stored in a self-loading binary image ("SLBI") 300, which is described in greater detail with reference to FIG. 3. As illustrated in FIG. 3, which is a layout diagram of the hard disk 16, in step 206, the SLBI 300 is written to the first track of the first hard disk, in this case, the hard disk 16, immediately following the master boot record ("MBR") 302. In accordance with the PC standard, the MBR 302 occupies the first sector of this track; the remainder of the track has no defined use. Assuming the hard disk claims 63 sectors per track, 62 sectors, or 31 kilobytes, are available in which to store the SLBI 300. As will be recognized by those of ordinary skill in the art, the MBR 302 includes an executable code, or bootstrap code, segment 302a, and a master partition table ("MPT") 302b, which contains information for describing how the disk 16 is divided into partitions.

The SLBI 300 includes a bootstrap loader 300a, disk preparation code 300b, and disk preparation data 300c collected in connection with the execution of step 200. The bootstrap loader 300a, which occupies a single sector at the start of the SLBI 300, performs a function similar to the partition boot record ("PBR") used to load an OS. In step 208, the sector address of the SLBI bootstrap loader 300a is placed into a partition descriptor of the master partition table ("MPT") 302b of the MBR 302. Exemplary values for the SLBI partition descriptor are as follows:

peBootable: 80h
peBeginHead: 0
peBeginSector: 2
peBeginCylinder: 0
peFileSystem: 06h
peEndHead: 0
peEndSector: 3Fh
peEndCylinder: 1
peStartSector: 2
peSectors: 3Eh Because the SLBI descriptor is marked "active," (i.e., bootable) (peBootable=80h), when the computer system 10 is rebooted, the MBR bootstrap code 302a will load the SLBI 300 into memory and transfer control thereto.

Referring once again to FIG. 2, in step 210, the system administrator is instructed to remove the CD-ROM containing the CSS program 24 from the CD drive and in step 212, the computer system 10 is rebooted.

FIG. 4 illustrates the operation of the SLBI 300. As previously indicated, because the SLBI descriptor in the MPT 302b is marked "active", when the computer system 10 is rebooted, control is transferred to the SLBI 300 (step 400). In step 402, the disk preparation code 300b and disk preparation data 300c are loaded into memory. It is likely that some sort of decryption may take place during this step. Upon completion of step 402, execution proceeds to step 404, in which the disk preparation code 300b prepares the hard disk 16 in a conventional fashion using the disk preparation data 300c values for utility partition size, primary partition size, and volume label. In particular, in step 404, the SLBI code partitions the disk 16 to include utility and primary partitions of the indicated sizes, the primary partition receiving the specified volume label, and then formatting these partitions appropriately.

In step 406, the SLBI 300 removes itself from the hard disk 16 and updates the MPT 302b by removing its descriptor therefrom and adding thereto descriptors for the newly-created partitions. In step 408, the computer system 10 is rebooted, at which point it is ready to receive files from the CSS program 24 or other sources.

In this manner, the hard disk 16 can be partitioned automatically during installation of a network OS with minimal user intervention.

Although an illustrative embodiment has been shown and described, a wide range of modification, change, and substitution is contemplated in the foregoing disclosure and in some instances, some features of the embodiment may be employed without a corresponding use of other features. Accordingly, it is appropriate that the appended claims be construed broadly and in a manner consistent with the scope of the embodiment disclosed herein.

What is claimed is:

1. A method of preparing a hard disk of a computer during installation of a network operating system thereon, the method comprising:

prompting a user to specify disk preparation data for said hard disk including a primary partition size, utility partition size and volume label;

storing said disk preparation data in a self-loading binary image ("SLBI") which includes a bootstrap loader;

writing the SLBI to a first track of the hard disk immediately following a master boot record (MBR) of the hard disk;

placing a sector address of the SLBI bootstrap loader into a partition descriptor of a master partition table (MPT);

rebooting said computer system from said SLBI;

partitioning the hard disk to include the utility partition size and the primary partition size, the primary partition receiving the volume label;

formatting the utility and primary partitions appropriately;

removing the SLBI from the hard disk and updating the MPT of said hard disk by removing its partition descriptor and adding a newly created partition descriptor for each of at least one partition created during said formatting and partitioning, wherein one such partition descriptor is marked as active; and rebooting said computer system.

2. The method of claim 1 further comprising the step of, prior to said prompting, booting said computer system from a computer-readable medium containing a computer server setup ("CSS") program, said CSS program including said SLBI.

3. The method of claim 2 wherein said computer-readable medium is a CD-ROM inserted in a CD-ROM drive of said computer system.

4. The method of claim 3 wherein the step of rebooting said computer system from said SLBI comprises:

updating said MPT to include a partition descriptor for said SLBI, said SLBI partition descriptor being marked as active;

instructing a user to remove said CD-ROM from said CD-ROM drive; and rebooting said computer system.

5. Apparatus for preparing a hard disk of a computer during installation of a network operating system thereon, comprising:

means for prompting a user to specify disk preparation data for said hard disk, the hard disk including a primary partition size, a utility partition size and a volume label;

means for storing said disk preparation data in a self-loading binary image ("SLBI"), the SLBI including a bootstrap loader;

means for writing the SLBI to a first track of the hard disk immediately following a master boot record (MBR) of the hard disk whereby a sector address of the SLBI bootstrap loader is placed into a partition descriptor of a master partition table (MPT);

means for rebooting said computer system from the SLBI;

the hard disk being partitioned to include the utility partition size and the primary partition size, the primary partition receiving the volume label;

the utility and primary partitions being formatted appropriately;

means for removing the SLBI from the hard disk and updating the MPT of said hard disk by removing its partition descriptor and adding a newly created partition descriptor for each of at least one partition created during said formatting and partitioning, wherein one such partition descriptor is marked as active; and means for rebooting said computer system.

6. The apparatus of claim 3 wherein said means for updating a master partition table ("MPT") of said hard disk to include a partition descriptor for each of at least one partition created during said formatting and partitioning further comprises means for removing said SLBI partition descriptor.

7. The apparatus of claim 3 wherein said computer-readable medium is a CD-ROM inserted in a CD-ROM drive of said computer system.

8. The apparatus of claim 7 wherein said means for rebooting said computer system from said SLBI comprises:

means for updating said MPT to include a partition descriptor for said SLBI, said SLBI partition descriptor being marked as active;

means for instructing a user to remove said CD-ROM from said CD-ROM drive; and means for rebooting said computer system.

9. A computer program product comprising:

a computer program processable by a computer system for causing said computer system to:

prompt a user to specify disk preparation data for said hard disk, said hard disk including a primary partition size, utility partition size and volume label;

store said disk preparation data in a self-loading binary image ("SLBI") which includes a bootstrap loader;

write the SLBI to a first track of the hard disk immediately following a master boot record (MBR) of the hard disk;

place a sector address of the SLBI bootstrap loader into a partition descriptor of a master partition table (MPT);

reboot said computer system from said SLBI;

partition the hard disk to include the utility partition size and the primary partition size, the primary partition size receiving the volume label;

format the utility and primary partitions appropriately;

remove the SLBI from the hard disk and update the MPT of said hard disk by removing its partition descriptor and adding a newly created partition descriptor for each of at least one partition created during said formatting and partitioning, wherein one such partition descriptor is marked as active; and reboot said computer system; and apparatus from which said computer program is accessible by said computer system.

10. The computer program product of claim 9 wherein said computer program further causes said computer system to boot said computer system from a computer-readable medium containing a computer server setup ("CSS") program prior to said prompting, said CSS program including said SLBI.

11. The computer program product of claim 10 wherein said computer-readable medium is a CD-ROM inserted in a CD-ROM drive of said computer system.

12. The computer program product of claim 11 wherein said rebooting said computer system from said SLBI comprises:

updating said MPT to include a partition descriptor for said SLBI, said SLBI partition descriptor being marked as active;

instructing a user to remove said CD-ROM from said CD-ROM drive; and rebooting said computer system.

\* \* \* \* \*